US008033973B1

(12) United States Patent
Evans

(10) Patent No.: US 8,033,973 B1
(45) Date of Patent: Oct. 11, 2011

(54) PIN WHEEL ROLLER ASSEMBLY

(76) Inventor: Daniel R. Evans, Brockton, MA (US)

( * ) Notice: Subject to any disclaimer, the term of this patent is extended or adjusted under 35 U.S.C. 154(b) by 932 days.

(21) Appl. No.: 12/009,872

(22) Filed: Jan. 23, 2008

Related U.S. Application Data

(63) Continuation-in-part of application No. 29/271,462, filed on Jan. 19, 2007, now Pat. No. Des. 562,632.

(60) Provisional application No. 60/881,906, filed on Jan. 23, 2007.

(51) Int. Cl.
*A01B 29/04* (2006.01)
*B26D 7/06* (2006.01)

(52) U.S. Cl. ................ 492/30; 492/39; 492/47; 492/48; 492/49; 83/423; 226/190; 452/143

(58) Field of Classification Search .................... 492/57, 492/30, 39, 47, 48, 49; 29/895, 895.2, 895.31, 29/895.21; 83/423; 226/76, 77, 86, 87, 190; 452/125, 127, 139, 130, 141, 143
See application file for complete search history.

(56) References Cited

U.S. PATENT DOCUMENTS

| | | | | |
|---|---|---|---|---|
| 1,646,711 | A * | 10/1927 | Spang | 452/143 |
| 2,324,050 | A * | 7/1943 | Shelley | 492/40 |
| 2,346,163 | A * | 4/1944 | Hiles | 400/616.3 |
| 3,969,828 | A * | 7/1976 | Roberts | 34/398 |
| 6,280,371 | B1 * | 8/2001 | Krippelz | 492/39 |
| D562,632 | S * | 2/2008 | Evans | D7/412 |

* cited by examiner

*Primary Examiner* — Sarang Afzali
(74) *Attorney, Agent, or Firm* — John P. McGonagle

(57) ABSTRACT

A pin wheel roller assembly for a bacon slicer. The roller assembly is formed with a number of individual spacer segments and an end cap. The pin wheel assembly is formed with a pin wheel sandwiched between adjacent cylindrical segments and the end cap.

8 Claims, 4 Drawing Sheets

PIN WHEEL ROLLER ASSEMBLY

CROSS-REFERENCE TO RELATED APPLICATIONS

Continuation-in-part of Application No. 29/271,462, filed on Jan. 19, 2007 now U.S. Pat. No. D,562,632. Applicant also claims the priority of U.S. Provisional Patent Application No. 60/881,906, filed on Jan. 23, 2007.

BACKGROUND OF THE INVENTION

This invention relates to bacon slicers, and in particular, to a pin wheel roller assembly used in a bacon slicer.

Pin wheel roller assemblies are used in bacon slicing machines to move the sliced bacon away from the slicing apparatus to a sliced bacon processing stage. The pin wheel roller assemblies are typically comprised of an elongated cylindrical tube with a number of sets of radial pins protruding circumferentially outward at various positions along the cylindrical tube. Because a set of pins protrudes outwardly along the same radially circumferential line about the cylindrical tube, each set of pins is commonly referred to as a pin wheel. A typical cylindrical tube has four pin wheels evenly spaced along the length of the cylindrical tube. The cylindrical tube rotates about its elongated central axis. The pin wheels rotate with the cylindrical tube, with the pins of each pin wheel engaging bacon slices and moving them radially across the cylindrical tube.

Since bacon slicers are dealing with edible products, each slicer and its corresponding pin wheel assembly must be cleaned at regular intervals. The cleaning process requires disassembling the slicer and specifically cleaning those parts touching the edible products being processed, including and especially the pin wheel assembly. Bacon slicers must also work at relatively high speeds to be economical. The high speed operation of the bacon slicer exerts substantially force on a pin wheel assembly. Pin breakage is common. With pin breakage, the bacon slicer must be stopped and the pin wheel roller removed and repaired.

Prior art pin wheel assemblies are typically comprised of an elongated, one-piece, cylindrical, hollow tube, with four sets of radial holes formed circumferentially about the tube at evenly spaced radial intervals along the length of the tube. Pins are inserted into each hole and welded to a backing ring within the tube. The points of the pin thereby protruding outwardly from the tube. Because of the prior art construction of pin wheel assemblies, repairing a prior art pin wheel assembly is tedious and time consuming.

SUMMARY OF THE INVENTION

The present invention overcomes the limitations of the prior art by providing a pin wheel assembly which has a modular construction. Pin wheels are not formed a pin at a time, but rather formed as an entire pin wheel in one step. The cylindrical tube is formed with typically four cylindrical spacer segments and an end cap. The pin wheel assembly is formed with a pin wheel between adjacent cylindrical segments and the end cap. Replacement of a pin is done by replacing an entire pin wheel. The invention pin wheel assembly can be disassembled and reassembled with a replacement pin wheel in minutes as opposed to hours needed for prior art pin wheel assemblies. Because the invention pin wheel assembly can be quickly disassembled and reassembled, cleaning is much easier, quicker and more thorough.

These together with other objects of the invention, along with various features of novelty which characterize the invention, are pointed out with particularity in the specification annexed hereto. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
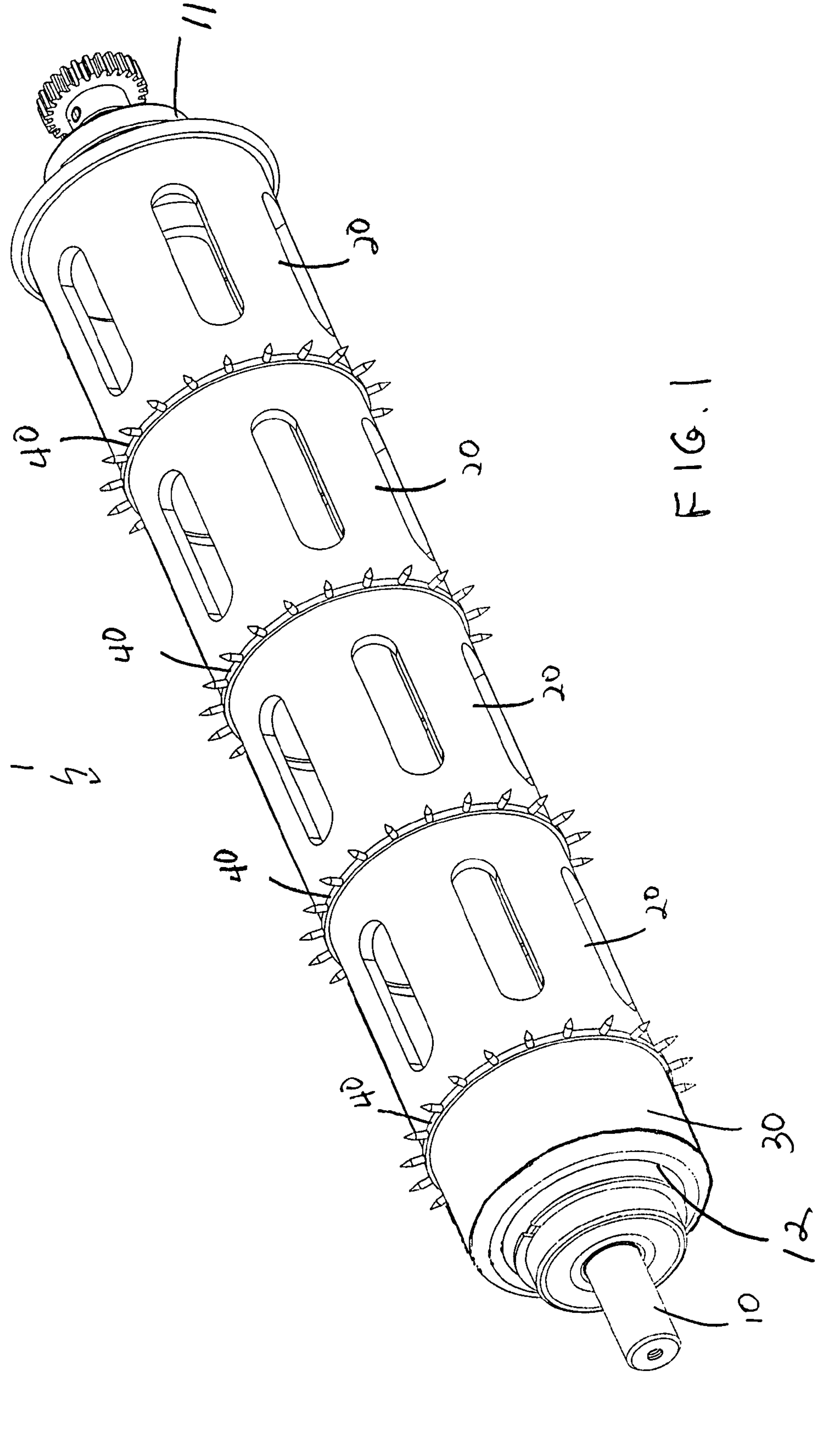
FIG. 1 is a perspective view of a pin wheel assembly constructed according to the invention.
Figure 2:
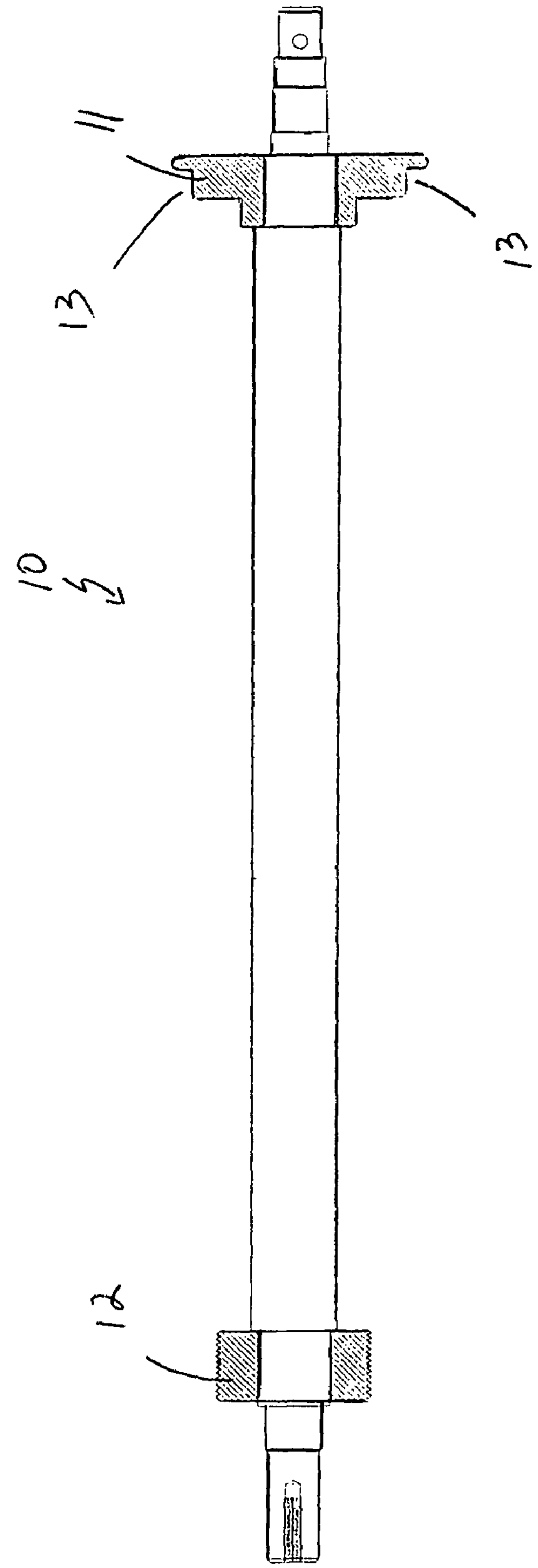
FIG. 2 is a side view of a shaft assembly.
Figure 3:
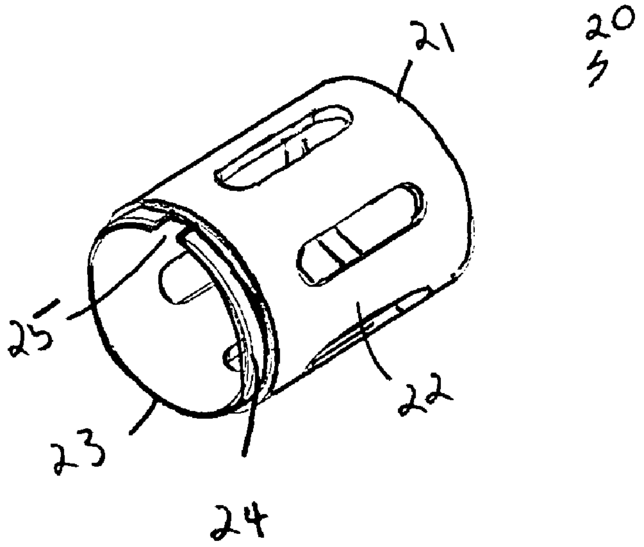
FIG. 3 is a perspective view of a cylindrical spacer segment.
Figure 4:
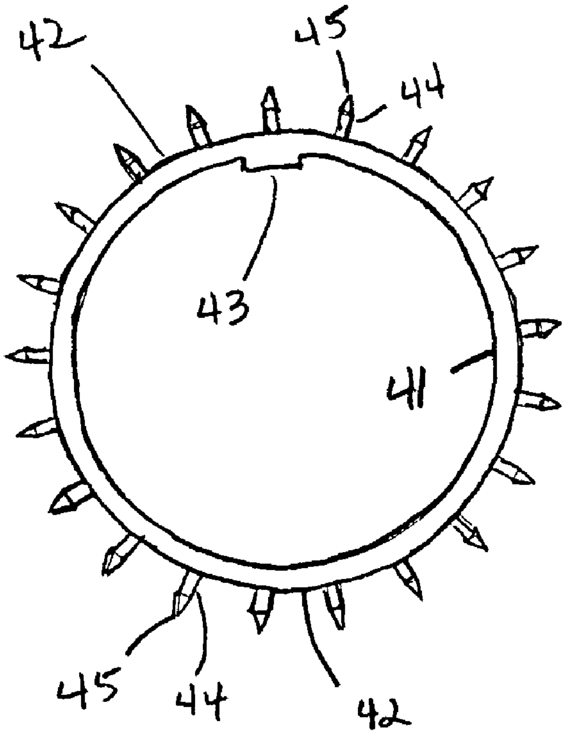
FIG. 4 is a front view of a pin wheel.
Figure 5:
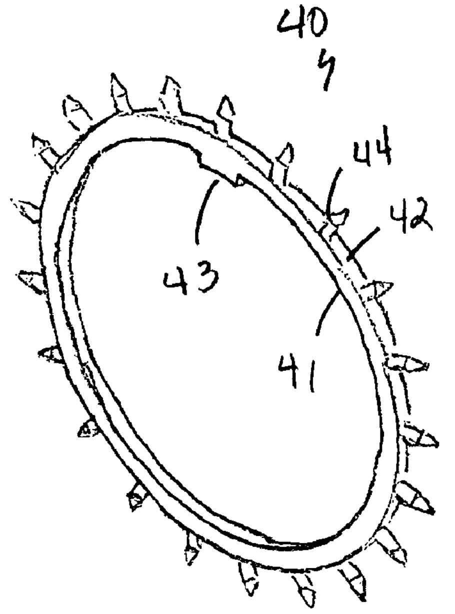
FIG. 5 is a perspective view of a pin wheel.
Figure 6:
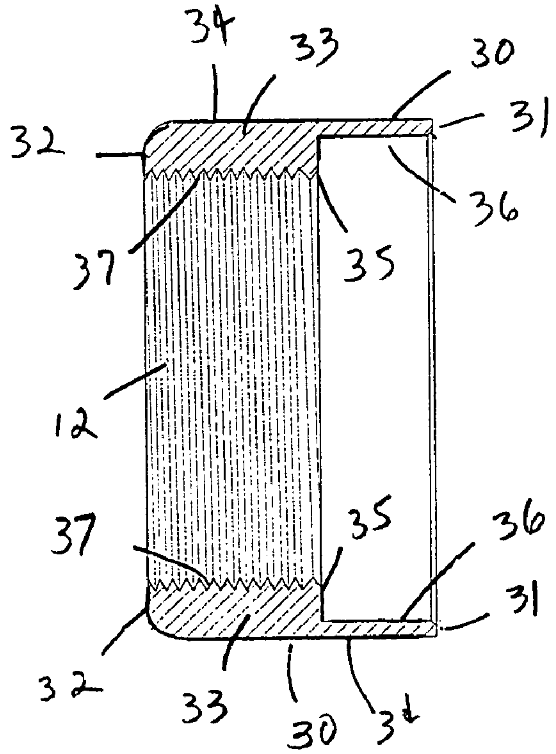
FIG. 6 is a side sectional view of an end cap.

Referring to the drawings in detail wherein like elements are indicated by like numerals, there is shown a pin wheel roller assembly 1 for a bacon slicer. The assembly is comprised, in part, of an elongated shaft 10 having two ends, one end terminating in a right hub 11, and the other end terminating in a threaded left hub 12. The shaft right hub 11 has a circumferential channel 13 formed therein.

The assembly 1 is further comprised of four, hollow, cylindrical spacer segments 20 and an end cap 30. Each cylindrical spacer 20 has an open right end 21 from which a cylindrical side wall 22 extends horizontally to an open left end 23. The side wall 22 has a radial channel 24 formed about its circumference adjacent the spacer segment left end 23. The spacer segment side wall radial channel 24 has a generally rectangular aperture 25 formed therein.

The end cap 30 has a right end 31, a left end 32, and a hollow cylindrical body 33 extending from said right end to said left end. The end cap body 33 has an exterior surface 34 and an interior surface 35. The end cap body interior surface 35 has a radial channel 36 formed therein adjacent the end cap right end 31. The non-channel portion 37 of the interior surface 35 is threaded.

The pin wheel roller assembly 1 is further comprised of four annular pin wheels 40. Each pin wheel 40 has an inner ring surface 41 and an outer ring surface 42. The inner ring surface has a generally rectangular key protrusion 43 extending radially inward toward the center of the pin wheel. The pin wheel outer surface 42 has a plurality of evenly spaced pins 44 extending radially outward from the pin wheel 40. Each pin 44 terminates outwardly in a point 45.

The pin wheel roller assembly 1 is formed by sliding a first spacer segment 20, right end 21 first over the shaft left hub 12 to the shaft right hub 11. The spacer segment right end 21 snugly fits into the shaft right hub radial channel 13. A first pin wheel 40 is slid over the shaft left hub 12 to the first spacer segment left end 23 and positioned onto the spacer segment left end radial channel 24. The pin wheel key 43 is fitted into the spacer segment left end radial channel aperture 25. A second spacer segment 20, right end 21 first, is then slid over the shaft left hub 12 to the first spacer segment left end 23. The second spacer segment right end 21 snugly fits onto the first spacer segment left end radial channel 24 sandwiching the first pin wheel 40 between the first and second spacer segments. This process is repeated until the four spacer segments 20 and four pin wheels 40 are positioned onto the shaft 10.

The final step is the addition of the end cap 30 onto the shaft 10. The end cap 30 is threadingly engaged to the shaft threaded left hub 12. The end cap interior surface radial channel 36 engages the fourth spacer segment left end radial channel 24 sandwiching the fourth pin wheel 40 between the end cap 30 and fourth spacer segment 20. The end cap 30 is threadingly tightened against the fourth pin wheel 40 and fourth spacer segment 20 thereby providing a "stiff" cylindrical tube with protruding pins about the shaft 10.

It is understood that the above-described embodiment is merely illustrative of the application. Other embodiments may be readily devised by those skilled in the art which will embody the principles of the invention and fall within the spirit and scope thereof. The number of pin wheel-spacer segments may be increased or reduced according to the needs of the slicer machine requiring a pin wheel roller assembly.

I claim:

1. A pin wheel roller assembly for a bacon slicer, comprising:

an elongated shaft having two ends, one end terminating in a right hub, and the other end terminating in a threaded left hub, said shaft right hub having a circumferential channel formed therein;

a plurality of hollow, cylindrical spacer segments concentrically placed about said elongated shaft;

an end cap concentrically placed about said elongated shaft adjacent and threadingly engaging said threaded left hub;

a plurality of annular pin wheels, each of said pin wheels concentrically placed about said elongated shaft, wherein one of said plurality of annular pin wheels is positioned between said end cap and an adjacent spacer segment, and wherein a remainder of said plurality of annular pin wheels are each individually positioned between said spacer segments;

wherein each of said cylindrical spacer segments has an open right end from which a cylindrical side wall extends horizontally to an open left end, said side wall having a radial channel formed about its circumference adjacent the spacer segment left end, said spacer segment side wall radial channel having a generally rectangular aperture formed therein.

2. A pin wheel roller assembly as recited in claim 1, wherein;

the end cap has a right end, a left end, and a hollow cylindrical body extending from said right end to said left end, said end cap body having an exterior surface and an interior surface, said end cap body interior surface having a radial channel formed therein adjacent the end cap right end, said cap body interior surface having a threaded non-channel portion.

3. A pin wheel roller assembly as recited in claim 2, wherein:

each of said pin wheels has an inner ring surface and an outer ring surface, said inner ring surface having a generally rectangular key protrusion extending radially inward toward a pin wheel center, said pin wheel outer surface having a plurality of evenly spaced pins extending radially outward from the pin wheel, each said pin terminating outwardly in a point.

4. A pin wheel roller assembly as recited in claim 3, wherein:

a first spacer segment right end is snugly fitted into the shaft right hub circumferential channel.

5. A pin wheel roller assembly as recited in claim 4, wherein:

a first pin wheel is positioned onto the first spacer segment left end radial channel, said pin wheel key being fitted into the spacer segment left end radial channel aperture.

6. A pin wheel roller assembly as recited in claim 5, wherein:

a second spacer segment, right end first, is then attached to said first spacer segment, wherein the second spacer segment right end is snugly fitted onto the first spacer segment left end radial channel sandwiching the first pin wheel between the first and second spacer segments.

7. A pin wheel roller assembly as recited in claim 6, wherein:

a remaining plurality of pin wheels is sandwiched between a remaining plurality of spacer segments;

wherein each of the remaining plurality of pin wheels is positioned onto a spacer segment left end radial channel, each of the remaining plurality of pin wheels having a key fitted into a spacer segment left end radial channel aperture;

wherein each of the remaining plurality of spacer segments is attached to an adjacent spacer segment, wherein each spacer segment right end is snugly fitted onto an adjacent spacer segment left end radial channel sandwiching a pin wheel between adjacent spacer segments.

8. A pin wheel roller assembly as recited in claim 7, wherein:

the end cap interior surface radial channel engages an adjacent spacer segment left end radial channel sandwiching a pin wheel between the end cap and adjacent spacer segment.

* * * * *